Patented Oct. 14, 1941

2,258,892

UNITED STATES PATENT OFFICE 2,258,892

ETHERS OF POLYGLYCEROLS

Benjamin R. Harris, Chicago, Ill.

No Drawing. Application August 25, 1938,
Serial No. 226,688

8 Claims. (Cl. 260—615)

My invention relates to new and useful improvements in ethers particularly of polyglycerols and in methods of producing the same. My present invention is a continuation in part of my prior application Serial No. 128,273, filed February 27, 1937, now Patent No. 2,173,203, which in turn is a division of my Patent No. 2,109,842.

The principal object of the present invention is the provision of new chemical compounds and compositions of matter adapted for use in various arts.

Another object is the provision of processes for producing such materials.

The ethers, particularly the polyglycerol ethers, of my present invention meet a demand or need for certain materials having in general some oleaginous or fatty character and also certain other characteristics. These characteristics may, in general, be summed up by the term "hydrophilic property." This hydrophilic property, however, is merely a broad generalization, as in different cases the characteristic is identified with the particular object or function desired in a particular art or industry. The ethers of my invention, quite apart from any consideration of their structure, possess certain characteristics and properties as emulsification agents, wetting agents, softening agents in the textile industry, and interface modifying substances, generally, having valuable uses in many industries, in each case imparting a property or function of a desirable character as will be in part disclosed hereinafter.

Considering the ethers of my invention more in detail, such ethers possess to varying degrees affinity for oleaginous materials as well as for water, aqueous solutions and aqueous materials in general. The affinity for oleaginous materials is imparted to the ethers principally by the presence of a lipophile group or groups, containing at least six but preferably from eight to eighteen or more carbon atoms, which impart to the molecule the tendency to dissolve or to disperse in oleaginous media; or at any rate a certain attraction for oleaginous materials. The free or unesterified hydroxy group or groups tend to impart to these ethers a capacity, to varying degrees, to dissolve or disperse in water or aqueous media in general or at least to have a certain attraction for water and aqueous materials. On the relative potencies of the lipophile and hydrophile portions of a given molecule, the resultant activity of the molecule as a whole depends. These potencies are a function not only of the mass and number of groups constituting these relative portions of the molecules, but also on their structural orientation.

My ethers may at will be prepared to be predominantly lipophile or predominantly hydrophile or balanced in the sense set out in great detail in U. S. Patents Nos. 1,917,250, 1,917,256, 1,917,249, and 1,917,257, in which event they manifest certain unique interfacial activities, such as the reduction of spattering of margarine during frying by virtue of their antispattering powers. The three arbitrary examples indicated hereinbelow and designated respectively as "A," "B," and "C" will help to explain one phase of the relative characteristics and behavior of my ethers.

| A | B | C |
|---|---|---|
| $H_2C-O-C_{18}H_{37}$ | $H_2C-O-C_{18}H_{37}$ | $H_2C-O-C_6H_{13}$ |
| $HC-O-C_{18}H_{37}$ | $HC-OH$ | $HC-OH$ |
| $CH_2$ | $CH_2$ | $CH_2$ |
| $O$ | $O$ | $O$ |
| $CH_2$ | $CH_2$ | $CH_2$ |
| $CHOH$ | $HC-OH$ | $HC-OH$ |
| $H_2C-O-C_{18}H_{37}$ | $H_2C-OH$ | $H_2C-OH$ |

In this set of examples of ethers of a diglycerol, "A" is predominantly lipophile, "C" is predominantly hydrophile, and "B" is intermediate and, by virtue thereof, possesses certain interfacial modifying properties not possessed at all by either "A" or "C" or not to anything like the same extent that they are manifested by "B." "C" is distinctly water soluble, "A" is distinctly fat soluble, while "B" is intermediate. All three, however, by virtue of the fact that in each of the three molecules there is present both a lipophile and a hydrophile portion, have marked affinities for both oleaginous and aqueous media. Insofar as interface modification in relation to emulsification is concerned, those of my ethers which are predominantly lipophile tend to favor the water-in-oil type of emulsion, whereas those which are predominantly hydrophile tend to favor the oil-in-water type of emulsion.

The ethers I describe herein have free hydroxy groups—at least one free hydroxy group, and, preferably, at least two per molecule—which impart hydrophilic properties to a molecule which otherwise would be predominantly lipophile in character by virtue of the lipophile group or groups etherified with the polyglycerol. Many of my ethers are potent antispatterers, others having wetting-out, penetrating and emulsifying properties, and all of them manifest activity at interfaces of varying degrees and in different manners, depending upon the character of the ethers and the interface in question. All of them, however, are interface modifiers, particularly for interfaces between aqueous and oleaginous media, or between an aqueous medium and a solid with an adsorbed layer of oil, fat or other oleaginous material.

My principal method for preparing the polyglycerol ethers is to polymerize glycerol to a desired molecular magnitude, whether it be diglycerol, triglycerol, tetraglycerol or higher polymerized glycerols or mixtures thereof, by heating glycerol by itself or in the presence of a catalyst, then, if desired, reducing the content or freeing the polyglycerol or polyglycerol mixture of unpolymerized glycerol, if any be present, and finally etherifying the polyglycerol material, preferably, free of glycerol, with an alcohol containing a minimum of six carbon atoms or a phenol or such alcohol or phenol mixture or with alkyl halides, sulphates or the like, or mixtures of same, by reacting the two types of reactants with or without the presence of an etherification catalyst or condensing agent.

These three principal steps, as well as certain other ones, in the preparation of the polyglycerol ethers, are described in the illustrative examples given hereinbelow.

The following examples are illustrative of the preparation of polyglycerols from which ethers of my invention may be produced:

*Example 1*

500 pounds of chemically pure 94% glycerol, in which are dissolved 5 pounds of caustic soda, are heated at approximately 260° C., after initially boiling off the original water content, for 4½ hours with vigorous aspiration of $CO_2$ over the surface at atmospheric pressure and with continuous mechanical stirring. The carbon dioxide gas minimizes oxidation and assists in carrying off moisture. Finally, the product is cooled in an atmosphere of carbon dioxide. The resulting polyglycerol product is a rather thick liquid of dark amber color and moderately caramelized odor and taste, with a mean molecular weight varying approximately between 148 and 163, while the molecular weight of an acyclic diglycerol is 166.

*Example 2*

3 parts of flaked sodium hydroxide are dissolved in 300 parts of 94% chemically pure glycerol. This solution is heated for nine hours under reflux in vacuo with a vigorous stream of nitrogen continually bubbling through the liquid. The nitrogen performs the function of stirring and assists in sweeping away water vapor. Heating is commenced, and, after the initial moisture present has been boiled off, the temperature of the mixture is raised to approximately 225° C. at a pressure of 160 mm. These conditions are attained by supplying sufficient heat to reach the temperature and applying sufficient vacuum by means of an evacuating jet or a pump, so that, despite the supply of nitrogen, a desired pressure of 160 mm. of mercury is attained. As the nine hour heating period progresses, the temperature is gradually raised to 240° C. at an approximately uniform rate and the pressure is gradually lowered to 65 mm. also at an approximately even rate, so that at the end of the nine hours the conditions are approximately 240° C. at 65 mm. pressure. The temperature of the reflux condenser is adjusted to allow all moisture to escape and to cause glycerol to reflux back into the reaction mixture. The resulting polyglycerol product, when cooled to room temperature, is very thick, almost solid, extremely dark and strongly caramelized in odor and taste. The mean molecular weight of the product is 326, whereas an acyclic tetraglycerol is 314.

*Example 3*

300 parts of 94% chemically pure glycerol with three parts of caustic soda dissolved therein are heated for seven hours at atmospheric pressure at a temperature of 225° to 230° C., under reflux. Carbon dioxide is kept bubbling through the liquid and the reflux condenser is maintained at a temperature of about 100° C. The product, when cooled to room temperature, is a practically odorless, viscous syrup with a very pale straw color. Its mean molecular weight is 168.

*Example 4*

500 pounds of 94% C. P. glycerol with 5 pounds of caustic soda dissolved therein are heated in vacuum under reflux until the initial moisture content is substantially distilled out. The temperature is then raised to 200° C. and the pressure adjusted to 127 mm. with $CO_2$ bubbling through the mixture. Heating is continued for eleven hours, the temperature being maintained approximately between 220° C., and the pressure gradually dropped at an approximately even rate from the initial pressure to 70 mm., $CO_2$ being continually bubbled through the mixture. Moisture, with small proportions of other materials, continues to escape, thereby giving a product, which, when cooled to room temperature, is an extremely viscous syrup of dark amber color but good odor and taste. Its mean molecular weight is 256, while the molecular weight of an acyclic triglycerol is 260.

*Example 5*

3 parts of caustic soda are dissolved in their own weight of water and the solution is then mixed with 300 parts of 94% glycerol, chemically pure grade. Nitrogen is bubbled through the mixture and heat and vacuum are applied, under reflux condenser, until the initial moisture is driven off. The temperature is then raised to 250° C. and heating under reflux with nitrogen bubbling through is continued for two and one quarter hours, manipulating the temperature from approximately 250° to 260° C., and the pressure between approximately 440 mm. and 120 mm., in an upward and downward direction, respectively, as the time interval progresses, more or less as described in the examples hereinabove. Under the hereindescribed rate of altering temperature and pressure, approximately 10% of the glycerol distills over, together with other volatile material, and apparently assists in carrying over moisture. On being allowed to cool, the product presents the appearance of a viscous syrup. It is practically odorless, has a pale straw color and the mean molecular weight is approximately 179.

*Example 6*

400 parts of glycerol with 4 parts of flaked caustic soda dissolved therein are heated under vacuo with $CO_2$ continually bubbling through the mixture for two hours at a progressive pressure of approximately 420 mm. to approximately 40 mm. of mercury, and a progressive temperature of approximately 250° to 260° C. (after boiling off the initial moisture present), the temperatures and pressures being manipulated in the order described hereinabove. On cooling to room temperature, the product is seen to be a straw colored, very viscous syrup, practically free of all odor and taste. Its mean molecular weight is approximately 207.

*Example 7*

The polyglycerol mixture obtained in Example 1 is steam distilled at a pressure of approximately 50 mm. to 20 mm. of mercury and at a temperature ranging from 180° C. to 200° C. for a period of two hours, using approximately one part of steam by weight to one part of polyglycerol material. The resultant product is practically entirely free of caramelized odor and taste. In other respects it has essentially the same properties as the product of Example 1.

Still other examples of preparing polyglycerols are described in my Patents Nos. 2,022,766 and 2,023,388.

While, in the above examples, polymerization has been carried out with the aid of caustic soda as a catalyst, polymerization may be obtained without the use of catalysts, or, when catalysts are employed, substances other than caustic soda may be used; for example, sodium carbonate, sodium bicarbonate, other alkaline carbonates and hydroxides, calcium oxide, magnesium oxide, zinc oxide, trisodium phosphate, sodium tetraborate, sodium acetate and other alkaline and potentially alkaline materials, iodine, zinc chloride, hydrochloric acid, and the like. Furthermore, the proportion of caustic soda or other catalyst may be varied. In general, however, polymerization proceeds much more slowly and with greater difficulty without than with a catalyst. Much higher temperatures and considerably longer heating periods are required. Indeed, other things being equal, on the average it may take three to four times as long to reach a given degree of polymerization. For these reasons, I prefer to employ a catalyst in polymerizing the glycerol to produce the polyglycerols which are intermediate products so far as my present invention is concerned.

Polyglycerols may also be prepared by purely monomeric chemical reactions carried out on glycerol, chlorhydrins, bromhydrins, iodhydrins, allyl alcohol, diallyl ether, glycide, epichlorhydrin and the like, as for example:

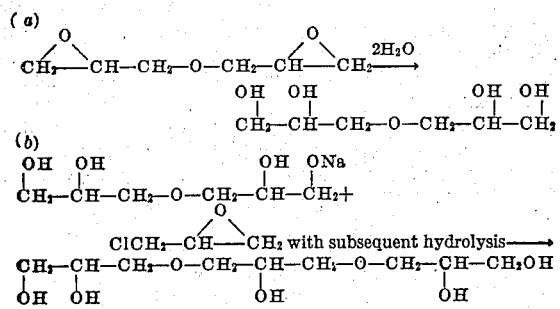

The partial ethers of the polyglycerols, which are the most important products of my present invention, may be prepared from said polyglycerols in a variety of ways by general methods well known in the art for etherifying alcohols. Thus, for example, a polyglycerol may be reacted with an alcohol containing at least six carbon atoms, such as hexyl alcohol, in the presence of sulphuric acid or other condensing agents. Again, a dialkyl sulphate such as dihexyl sulphate, may be reacted with a polyglycerol in the presence of an alkali such as potassium hydroxide or sodium hydroxide. Another method which may be utilized involves adding two equivalents of caustic soda or the like to glycerol in which case polymerization proceeds rapidly at lower temperatures. Then, with alkali already present, the ethers may be made simply by the addition of the desired alkyl halide.

Another effective method of producing the ethers of the present invention comprises suspending a sodium or potassium or similar salt of a polyglycerol, or other polyhydric alcohol as disclosed hereinafter, in finely divided form in an excess of a lipophile or alkyl halide and reacting the mixture at about 190° C. or higher, if necessary, with constant agitation. After completion of the reaction, the unreacted halide can be removed, if desired, by fractional crystallization, by distillation, by extraction with solvents, or by any other means. Furthermore, the halide salt formed in the reaction may be eliminated in any desired manner. The reaction described makes use of the principle of employing one of the reactants, which is preferably liquid at the reaction temperatures utilized, as a solvent medium for carrying out the reaction. Thus, for example, a triglycerol, the hydrogen of two or three hydroxy groups of which is replaced, for example, by sodium or potassium, may be suspended in a large excess of octyl bromide and the reaction effected at elevated temperatures. The sodium or potassium bromide, as the case may be, and the unreacted octyl bromide may be removed from the formed ethers, if desired, in accordance with procedures known to those versed in the art.

In those cases where the compounds sought to be produced are mono-ethers of polyglycerols or the like, it is best to employ an excess of the polyglycerol or other polyhydric alcohol and only one equivalent of potassium hydroxide, sodium hydroxide, sodium or potassium, or other basic material, as the case may be, for each equivalent of lipophile halide or higher molecular weight halide which is utilized to introduce the lipophile group into the molecule. Thus, for example, two mols of a diglycerol may be heated with one mol of potassium hydroxide to expel the water and the resulting potassium salt of the diglycerol may then be reacted with one mol of alkyl halide such as lauryl chloride to produce the mono-lauryl ether of diglycerol.

To make a poly-ether, for example, a di-ether, one equivalent of a polyglycerol or a hexahydric alcohol such as mannitol or sorbitol, or the like, may be reacted with two equivalents of potassium hydroxide and with at least two equivalents of lipophile halide. Or, where the lipophile halide is utilized as the solvent medium for the reaction, as described hereinabove, it may be employed in considerable excess.

In the light of the above considerations, it will be clear that the amount of alkali metal or the like present in the polyhydric alcohol or capable of replacing hydroxyl hydrogens thereof is determinative, in this type of method of producing my ethers, of the number of ether groups present in the final molecule. Both the polyglycerol or the like and the lipophile halide may be present and be tolerated in large excess without affecting the number of ether groups which are formed, such being limited, as stated, by the content of alkali or like condensing agent, provided, of course, that said polyglycerol and lipophile halide are present in amounts sufficient to react with all of the alkali or the like present.

Still other methods are illustrated in the following equations, it being understood that the radical R contains at least three and preferably from seven to seventeen carbon atoms:

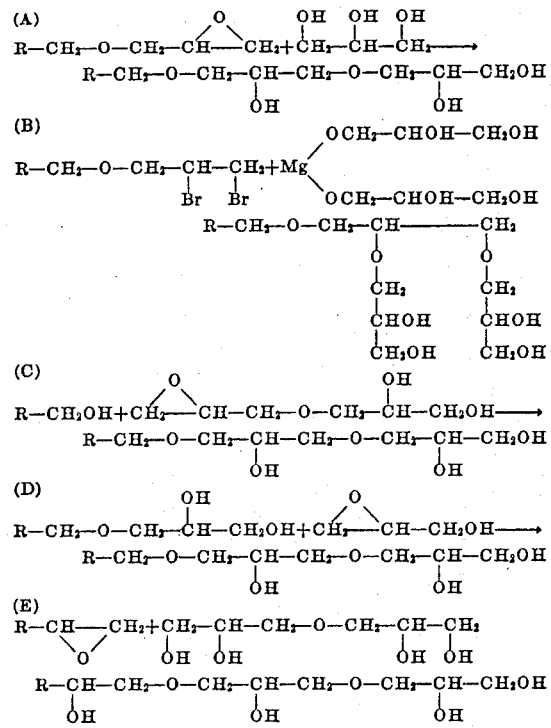

It will be understood that the above represent merely illustrative modes of reactions whereby my polyglycerol ethers may be prepared. The selection of temperatures, proportions of reactants, condensing agents, and times of reactions may be made within relatively wide limits without departing from the spirit of the invention.

The following specific examples are illustrative of methods which may be employed for preparing the ethers of my invention. As indicated, other methods may be used, the proportions of reacting ingredients, time of reaction, order of steps, and temperatures may be varied, and supplementary processes of purification and the like may be resorted to wherever found desirable or convenient. These and other variations and modifications will be evident to those skilled in the art in the light of the guiding principles which are disclosed herein:

*Example 1*

13.75 parts of 96% sodium hydroxide were dissolved in 20 parts of water and mixed with 200 parts of a polyglycerol of a mean molecular weight of 245. The mixture was heated for a period of 20 minutes at a temperature of 190° C., permitting the water to escape. To the hot solution was added, with vigorous stirring, a suspension of 100 parts of commercial lauryl sulfate sodium salt in 300 parts of polyglycerol of a mean molecular weight of 245. The stirring and heating were continued for one hour at a temperature of 190°–200° C. The reaction mixture was diluted with 3 volumes of water and such an amount of hydrochloric acid added that the actual hydrochloric acid concentration amounted to 3%. The solution was refluxed for one hour. After cooling, a portion of the solution was extracted with twice its volume of a 50–50 isopropyl alcohol-petroleum ether mixture. The extracted aqueous layer was then extracted twice with ethyl ether. The ethyl ether was evaporated off and a brown syrup was obtained. The product obtained is a polyglycerol ether of a n-1-dodecanol. This syrup was free of sulphur, indicating the absence of the starting material—lauryl sulfate sodium salt. The syrup was completely water-soluble without turbidity. The water solution was a good foamer and wetting agent. The syrup is a good anti-spatterer when mixed with oleomargarine in a 1% concentration.

By the Draves test using .1% of the above product in tap water, the skein sank in one minute and 50 seconds. The syrup, dissolved in distilled water at a concentration of .1%, reduced the surface tension of the distilled water 57.7%. This determination was made in air at 28.5° C. with a de Nouy instrument.

*Example 2*

13.75 parts of 96% sodium hydroxide were dissolved in 20 parts of water and mixed with 300 parts of polyglycerol of a mean molecular weight of 245. The solution was heated at 195° C. for 20 minutes, and the water permitted to escape. The mixture was allowed to cool down to 160° C. and 207 additional parts of the polyglycerol were added together with 48 parts of a 90% pure n-1-octylchloride. With stirring and under reflux, the temperature was allowed to rise to 190° C. The heating and stirring were continued for 25 more minutes. From the reaction mixture, sodium chloride precipitated out. The reaction product, a very viscous, straw colored mass, is completely water soluble. 2.5 grams of the reaction mixture dissolved in 500 cc. of tap water (representing .1% of active material) was used for the Draves test. The skein sank in 7 minutes. The aqueous solution is a very good foamer. The product obtained is a polyglycerol ether of n-1-octyl alcohol.

*Example 3*

5.2 parts of 96% sodium hydroxide, dissolved in 10 parts of water, were mixed with 188 parts of polyglycerol of a mean molecular weight of 166. The mixture was heated to a temperature of 190° C. while stirring and kept at that temperature for 10 minutes to drive off water. The temperature was lowered to 170° C. While stirring, 17 parts of n-1-octylchloride of 90% purity were added through a reflux condenser. Heating was continued under reflux, with stirring for a period of 20 minutes, whereby the temperature of the reaction mixture gradually rose to 190° C. During this period the octylchloride gradually disappeared as was indicated by the diminishing amount of refluxing material. The stirring was continued for 30 more minutes at a temperature of 190°–200° C. After cooling, some of the reaction product, a straw-colored, syrupy, viscous, clear, transparent liquid, was dissolved in water and this water solution showed a very fine haze only and foamed very well. The product is a polyglycerol ether of a n-1-octylalcohol.

*Example 4*

5.55 parts of 96% sodium hydroxide were dissolved in 10 parts of water and added to 213 parts of polyglycerol of a mean molecular weight of 245. The solution was heated to 180° C. to drive off water and 43½ parts of octadecyl sulfate sodium salt were introduced. The mixture was stirred at a temperature of 190°–200° C. for 35 minutes. The reaction product was dissolved in 550 parts of water and such an amount of hydrochloric acid added that its ultimate concentration amounted to 3%. The solution was kept at 100° C. for one hour with occasional stirring, whereby an oily layer separated. After cooling, the oily part solidified to a half solid mass which was removed and redispersed in about 500 parts of water. This water dispersion was extracted repeatedly with a 50-50 isopropyl alcohol-ethyl ether mixture. The solvent phase was separated and evaporated off. A brown solid mass was obtained which was a slight foamer in hot water and which, in a concentration of .1%, reduced the surface tension of distilled water by 29.5%, and showed a capacity for reducing the spattering of margarine during frying.

*Example 5*

13.75 parts of 96% sodium hydroxide were dissolved in 20 parts of water and added to 450 parts of mannitol. The mixture was heated to 190° C. for a period of 10 minutes to drive off water. Through a reflux condenser 67 parts of 94% lauryl chloride were introduced and, with stirring, the heating was continued for four hours at a temperature of 190°-200° C. The reaction product, a dodecyl ether of mannitol, dispersed in water with foaming.

The lipophile group or groups of my ethers, as stated, may contain as low as six carbon atoms, but usually contain at least eight carbon atoms, and ordinarily from six to thirty carbons or more. Such groups may be derived from various sources, such as, from aliphatic straight chain and branched chain alcohols such as hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, branched chain octyl, decyl, dodecyl, tetradecyl, hexadecyl and octadecyl aliphatic alcohols as, for example, 2-ethyl hexanol-1, 2-n butyl octanol-1, 2-butyl tetradecanol-1, and, in general, the higher molecular weight saturated and unsaturated aliphatic straight chain and branched chain alcohols. Preferably, the alcohols which are utilized are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred. Other alcohols which may be employed are the cyclo-aliphatic or ali-cyclic alcohols such as the sterols, as, for example, cholesterol, iso-cholesterol, phytosterol, sitosterol, hydroaromatic alcohols, such as abietol, and such unsaturated alcohols as linalool, citronellol, geraniol and the like and hydrogenated products of the foregoing. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, di-hydroxy stearic acid, 1-hydroxy-stearic acid, alpha-hydroxy palmitic acid, and the like, as well as esters of hydroxy-fatty acids, such as ethyl ricinoleate, castor oil, butyl alpha-hydroxystearate, cetyl hydroxystearate, and the like.

The term "alcohols," as employed herein, is intended to include alcohols which may or may not contain other groups such as carboxylic, carbonyl, cyanogen, sulphone, sulphoxide, halogen, sulphonic, sulphate, or other radicals.

It is, of course, obvious that the alcohols from which the ethers may be produced may be prepared in accordance with any desired method. For example, many of these alcohols may be prepared by the so-called Bouveault and Blanc method or, alternatively, by the reduction or catalytic reduction with hydrogen of natural or hydrogenated animal or vegetable fats and oils, or mixtures thereof, in accordance with well known practices. Again the alcohols may be derived from synthetic processes such as by the oxidation of hydrocarbons or may be prepared by saponification of waxes and the like. Alternatively, they may be prepared by reduction of aldehydes or by the Grignard reaction.

It is likewise apparent that mixtures of the foregoing or other alcohols or their derivatives may be utilized in the preparation of the ethers as, for example, the mixture of alcohols resulting from the hydrogenation of coconut oil or the free fatty acids of coconut oil. Lauryl alcohol comprises about 45% of the total alcohol mixture, the remaining alcohols running from $C_6$ to $C_{18}$. Again, mixtures of alcohols such as are present in the so-called sperm oil alcohols, as well as those present in wool-fat, may efficaciously be utilized. Indeed, these higher molecular weight alcohols are generally offered on the market in the form of mixtures of different alcohols. If desired for any specific purpose, special fractions which predominate in a certain particular higher molecular weight alcohol may be utilized or, if so desired, the products may be prepared from a single, substantially pure alcohol.

The lipophile group in my ethers may also comprise lipophile radicals derived from: phenol, cresols, xylenols, naphthols and the like, and substitution derivatives thereof, and sulphonated and halogenated hydrocarbons, particularly chlorinated petroleum derivatives. These latter give valuable products when reacted with polyglycerol derivatives or the like, such as sodium salts thereof.

While my present invention includes the preparation of relatively pure substances having decided advantages for certain purposes, it should be remembered that, for many purposes, mixtures are more potent and produce better results than the relatively pure substances. For this reason, I prefer to use a mixture of alkyl derivatives for etherification with the polyglycerols rather than a relatively pure alkyl derivative. Mixed alkyl derivatives derived from many of the ordinary oils and fats can, therefore, be used with very good results, in many cases.

In general, my ethers, with respect to their consistency and other purely physical characteristics, are approximately parallel to the alcohols or mixtures of alcohols from which they are derived; that is to say, an ether derived from a liquid alcohol is normally liquid at room temperature, one derived from a solid alcohol or mixture of solid alcohols is likely to be solid at room temperature. This does not mean, however, that the physical characteristics of the ethers are identical with those of the alcohols or phenols or the like from which they are derived. In fact, in general, the ether is somewhat softer in the case of solid ones, and in the case of liquid ones somewhat more viscous and syrupy than the liquid alcohols from which they are derived. The colors of those of my ethers which are derived from polyglycerols depend largely on the color of the polyglycerol mixture, in the sense that a dark colored polyglycerol mixture will produce a dark colored ether, irrespective of how good the color of the fatty material may be. It is, therefore, advantageous in general to use polyglycerol products of good color, methods for the preparation of which have been fully described herein.

Some of the improvements in the methods I employ in accordance wtih my present application result from the improved manner of preparing the initial polyglycerols. Although various features of the method of preparing the polyglycerols are new, the claims of my present invention are directed only to the ethers and their manner of preparation.

While my invention is particularly directed to the preparation of ethers of polyglycerols which represent the most important aspect of the invention because of their cheapness, ease of manufacture, stability, and the like, I also include within the broader scope of my invention, and as indicated in various of the above examples, the preparation of ethers from aliphatic polyhydroxy substances, which polyhydroxy substances are free from aldehyde and ketone groups, including, for example, mannitol, sorbitol, and other hexitols or hexahydric alcohols, pentantetrol, hexylerythrite, pentite, and hexapentoles, disorbitol, dimannitol, rhamnohexite, mannooctite, and the like, mono- and di-carboxylic acid sugar or like derivatives, such as gluconic acid, mucic acid, and the like, and additional ether-type condensation products of certain polyhydric alcohols as, for example,

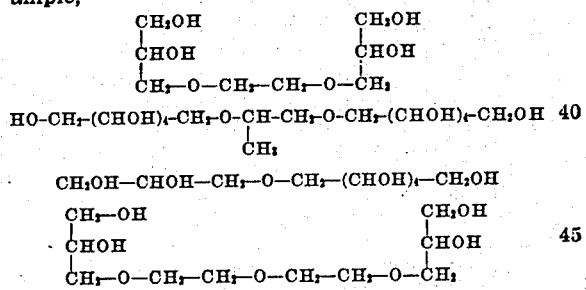

In general, ethers prepared from aliphatic polyhydric alcohols containing at least six carbon atoms, which polyhydric alcohols consist only of carbon, hydrogen, and oxygen, and wherein the oxygen-containing groups are limited to hydroxy groups or ether groups, produce products having desirable properties.

It will be appreciated that the methods described hereinabove may be utilized in preparing the ethers of such polyhydric alcohols.

Some of the substances which are illustrative of the ethers of my invention are as follows:

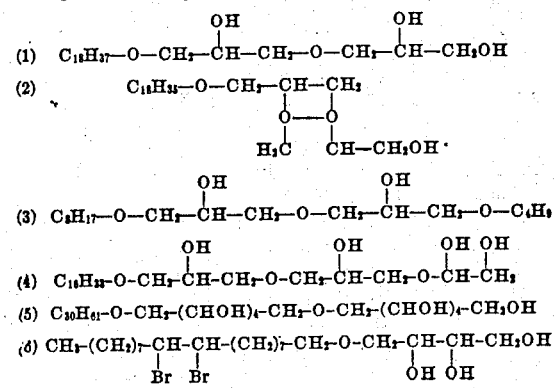

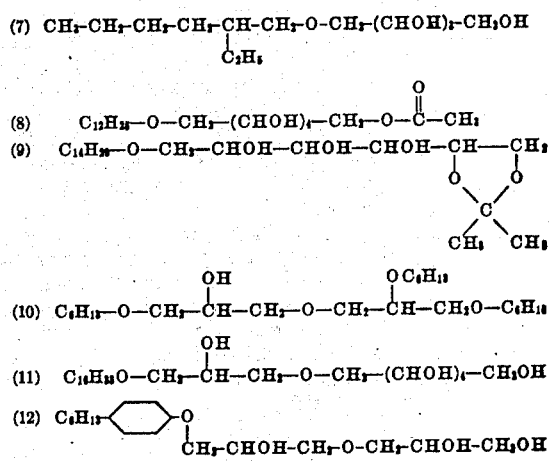

At least many of the compounds of the present invention have utility in various arts in which interface modifying agents are employed. They are resistant to precipitation by calcium and magnesium salts. They may be utilized in the textile and related industries wherein they function for softening, wetting, emulsifying, penetrating, and dispersing purposes. The textiles, various treatments of which in the presence of the agents of the present invention is rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing and mercerising of textiles they may be employed as effective assistants. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of my invention may be placed is for the treatment of paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, in shoe polishes, in rubber compositions, for breaking and demulsifying petroleum emulsions such as those of the water-in-oil type which are encountered in oilfield operations, and for various other purposes which will readily occur to those versed in the art in the light of my disclosure herein.

Examples of emulsion formulae improved by the employment of the ethers of my present invention are as follows, by way of illustration:

Cold cream

| | | |
|---|---|---|
| Almond oil | cc | 1100 |
| White wax | grams | 295 |
| Borax | do | 20 |
| Di-lauryl ether of diglycerol | do | 40 |
| Water | cc | 570 |
| Perfume to suit. | | |

Brushless shaving cream

| | | |
|---|---|---|
| Stearic acid | ounces | 26 |
| Mineral oil | do | 3 |
| Lanolin | do | 2 |
| Water | do | 64 |
| Triethanolamine | do | 1 |
| Preservative | grams | 5 |
| Perfume | cc | 5 |
| Monocetyl ether of triglycerol | ounces | 5 |

The water and triethanolamine are admixed and heated to 80° C. The lanolin, stearic acid, mineral oil and preservative are then heated to 80° C. and added, with constant stirring, to the aqueous solution of triethanolamine, the stirring being continued until the mass reaches a temperature of 45° C. Then the perfume, dissolved in the monocetyl ether of triglycerol, is added, with stirring, to the emulsion, and the final emulsion allowed to cool to room temperature.

Vanishing cream

| | | |
|---|---|---|
| Stearic acid | grams | 400 |
| Potassium hydroxide | do | 27 |
| Water | cc | 1600 |
| Mono-hexyl ether of mannitol | grams | 40 |
| Perfume to suit. | | |

Brushless shaving cream

| | | |
|---|---|---|
| Stearic acid | grams | 184 |
| Mineral oil | cc | 20 |
| Lanolin | grams | 20 |
| Water | cc | 685 |
| Glycerin | cc | 52 |
| Soap (potassium stearate) | grams | 5 |
| Mono-lauryl ether of mannitol | do | 35 |

(The lanolin may, if desired, be omitted without impairing the quality of the cream or its utility in shaving.)

Brushless shaving cream

| | | |
|---|---|---|
| Stearic acid | grams | 180 |
| Mineral oil | do | 30 |
| Lanolin | do | 20 |
| Borax | do | 5 |
| Triethanolamine | do | 5 |
| Glycerine | do | 40 |
| Water | do | 720 |
| Mono- or di-octyl ether of sorbitol | do | 25 |

The ethers of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in the presence of sodium carbonate, sodium bicarbonate dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alcohol or alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulpho-carboxylic acid esters of higher molecular weight alcohols such as lauryl sodium sulphoacetate, dioctyl sodium sulpho-succinate, dilauryl potassium sulpho-glutarate, lauryl monoethanolamine sulpho-acetate, and the like; sulphuric and sulphonic derivatives of condensation products of alkylolamines and higher fatty acids; Turkey-red oils; compounds of the type of isopropyl naphthalene sodium sulphonate, and other classes of wetting agents.

It will be understood that the products may be employed in the form of impure reaction mixtures containing substantial proportions of the effective interface modifying agent or agents or, if desired, for any particular purposes, purification procedures may be employed to produce pure or substantially pure products. Those versed in the art are familiar with the types of purification methods which may be employed with advantage herein, particularly in the light of the disclosures made hereinabove.

What I claim as new and desire to protect by Letters Patent of the United States is:

1. Ethers of polyglycerols wherein at least one hydroxyl hydrogen of the polyglycerols is replaced by a lipophile radical of at least six carbon atoms, said ethers having at least one free polyglycerol hydroxy group.

2. Ethers of polyglycerols and alcohols containing at least six carbon atoms, said ethers having at least one free polyglycerol hydroxy group.

3. Ethers of polyglycerols and aliphatic alcohols containing from six to eighteen carbon atoms, said ethers having at least one free polyglycerol hydroxy group.

4. Ethers of aliphatic alcohols containing from six to eighteen carbon atoms with a mixture of polyglycerols, the major portion of which comprises diglycerol, said ethers containing at least two free polyglycerol hydroxy groups.

5. Lauryl ethers of polyglycerols, said ethers containing at least one free polyglycerol hydroxy group.

6. Monolauryl ether of diglycerol.

7. Ethers of polyglycerols with aliphatic alcohols containing from six to eighteen carbon atoms, said ethers having at least two free polyglycerol hydroxy groups.

8. Octyl ethers of polyglycerols, said ethers containing at least one free polyglycerol hydroxy group.

BENJAMIN R. HARRIS.